Oct. 3, 1961 — E. A. STALKER — 3,002,265
FABRICATION OF BLADES FOR COMPRESSORS AND THE LIKE
Filed Feb. 14, 1957 — 2 Sheets-Sheet 1
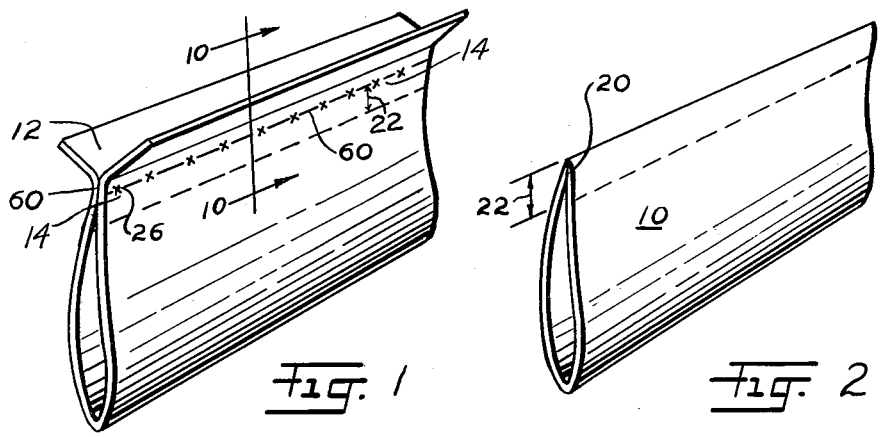
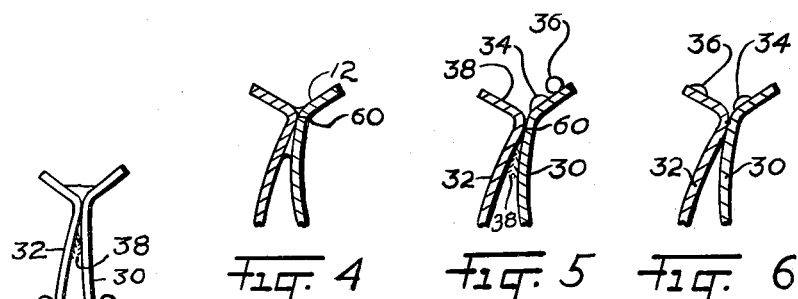
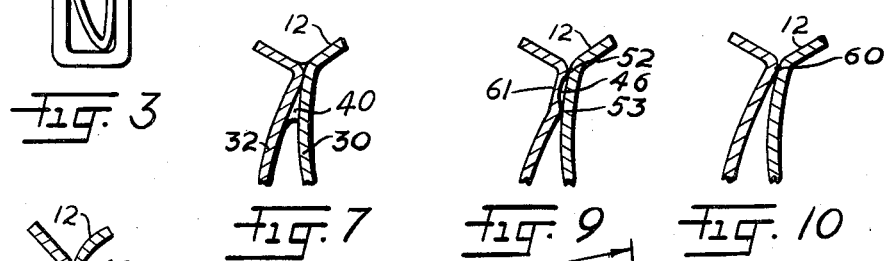
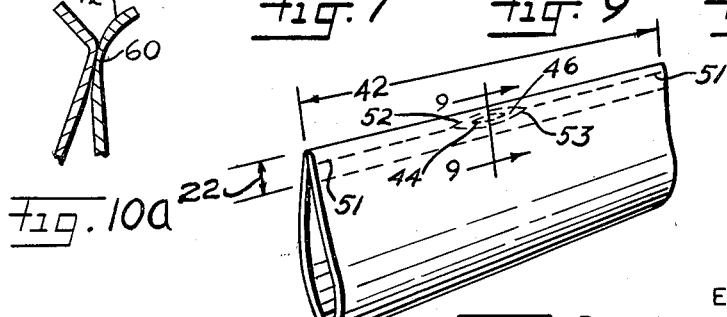
INVENTOR.
EDWARD A. STALKER
BY Marechal, Biebel, French & Bugg
ATTORNEYS Oct. 3, 1961      E. A. STALKER      3,002,265
FABRICATION OF BLADES FOR COMPRESSORS AND THE LIKE
Filed Feb. 14, 1957      2 Sheets-Sheet 2
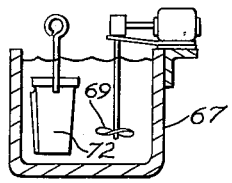
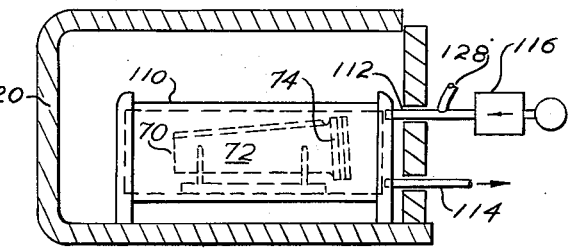
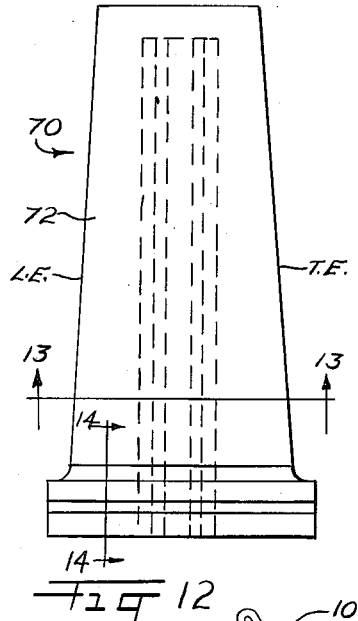
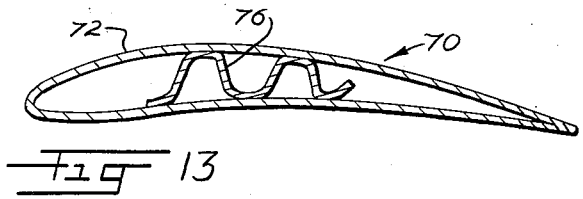
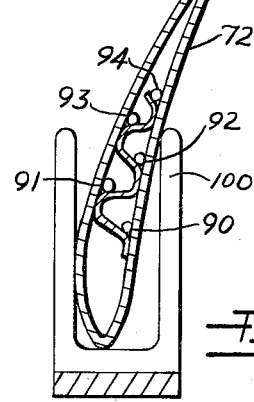
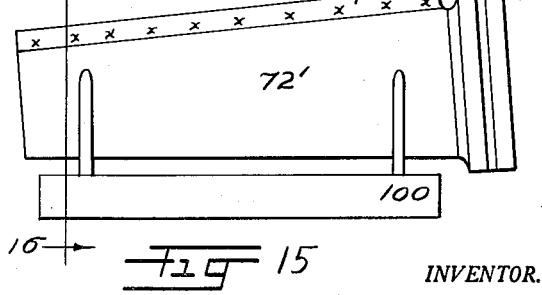
INVENTOR.
EDWARD A. STALKER
BY
ATTORNEYS

United States Patent Office 3,002,265
Patented Oct. 3, 1961

3,002,265
FABRICATION OF BLADES FOR COMPRESSORS AND THE LIKE
Edward A. Stalker, Bay City, Mich., assignor to Stalker Corporation, a corporation of Michigan
Filed Feb. 14, 1957, Ser. No. 640,198
8 Claims. (Cl. 29—156.8)

This invention relates to the making of joints by solder, particularly the joints of blades for and other parts of compressors and turbines.

The object of the invention is to provide processes for soldering metal parts together where they contain alloying metals which cannot be reduced by gaseous agents such as hydrogen.

Other objects will appear from the specification, accompanying drawings and the appended claims.

The above objects are accompanied by the means illustrated in the accompanying drawings in which—

FIG. 1 is a perspective view of an unfinished blade with its trailing edge projections or trough;

FIG. 2 is a perspective view of a finished blade after being soldered and the trough cut off;

FIG. 3 shows an unfinished blade supported for a soldering operation;

FIG. 4 is a fragment of a blade in section showing the soldered joint and fillet;

FIG. 5 is a section of the end of a blade with the flux and solder in place;

FIG. 6 shows the wall fragments of FIG. 5 with a different arrangement of flux and solder;

FIG. 7 shows the wall fragments of FIGS. 5 and 6 after the soldering operation;

FIG. 8 shows a blade with a soldered joint having a void in the joint;

FIG. 9 is a fragmentary section on line 9—9 in FIG. 8, showing a void caused by spaced lines of contact;

FIG. 10 is a fragmentary section on line 10—10 of FIG. 1;

FIG. 10a is a fragmentary section of the trailing edge portion of a blade with scarfed portions, otherwise similar to the blade of FIG. 1;

FIG. 11 shows a vessel containing a flux mixture;

FIG. 12 is a plan view of a blade for compressors, turbines and the like;

FIG. 13 is a section on line 13—13 of FIG. 12;

FIG. 14 is a section on line 14—14 of FIG. 12;

FIG. 15 shows a blade supported in a rack for soldering;

FIG. 16 is a section on line 16—16 of FIG. 15; and

FIG. 17 shows a retort containing the blade in a furnace.

Where metal parts contain metallic elements whose oxides cannot be reduced by a gas such as hydrogen it is desirable to use a flux which upon melting at high temperatures will dissolve and wash away these oxides. For instance steels which contain titanium or aluminum have oxide films or have surface aprticles which interfere with the bonding or fusing together of the walls of a joint into a strong union.

In the use of flux it has heretofore been the practice to mix the flux and the solder either before heating or during the process of heating. Such a process presents unsatisfactory joints for highly stressed parts such as blades because of porosity or voids in the joints, or ragged edges of the joint.

For instance in soldering the upper and lower walls of a blade together to form the trailing edge, the area of bonding should be free of voids and the solder should have a smooth uniform edge inside the blade so as to facilitate a flow of cooling air (where required for instance) through the blade and also to exclude tendencies of the blade to crack at the joint due to vibration fatigue. A ragged edge of the solder will promote fatigue cracks.

Where the solder and the flux are mixed and a substantial quantity is applied, as in a recess, the flux as it is heated tends to blow the solder about making jagged projections and edges and tending to make the joint porous.

Referring now to the drawings illustrating preferred forms of the invention, FIG. 1 shows an unfinished blade 10 with the alloying trough 12 along its trailing edge. The trough is to be cut off subsequently along the trailing edge line 14.

The blade is to be provided with a joint 20 extending along the full length of the trailing edge and of a chordwise depth 22, FIGS. 2 and 8. The joint areas defined between the trailing edge and the front edge of the joint is to be free of voids.

The steps in producing the joint according to this invention comprise fixing the two walls together at spaced points, preferably by spot-welds 26, and dipping the trailing edge portion of the blade in a bath of flux. This is preferably a water solution or mixture of flux salts. Preferably the bath is at a temperature between 120° F. and 150° F. and may be a saturated solution. The blade is preferably dried with the trailing edge down so that drainage will occur toward the trailing edge and trough. Preferably with nickel-chromium solders the flux is wiped off the interior surfaces of the trough. The blade is then inverted and in the position shown in FIG. 1 the trough is loaded with the solder, whether as a wire or as powder, with the blade chord vertical and the trough above the joint. After loading or alloying, the blade is heated in a reducing atmosphere to melt the solder and effect the bonding of the walls together.

The flux components or ingredients are selected so that the majority of the flux melts at a temperature substantially below the melting temperature of the solder. A suitable flux is a mixture of boracic acid, sodium chloride, sodium fluoride and the like. A small amount of borax may also be included.

The blade is preferably placed in a muffle in a furnace, to be heated uniformly. Hydrogen or another reducing agent is passed through the muffle thereby maintaining a reducing atmosphere in the muffle.

As the temperature reaches a selected value corresponding to the selected components of the flux, the flux melts and covers the surfaces of the joint, dissolving the oxides and cleaning the surfaces of the metal walls. The surfaces are thus cleaned and protected until the solder melts. After this has occurred and as the temperature of the blades rises, the solder flows downward into the joint displacing the flux ahead of it. Thus the flux and its dissolved oxides moves as a separate layer ahead of the solder and at a substantially later period the solder moves onto clean surfaces with the result that the solder effects a strong fusion of the walls together.

Since the flux is melted and flows over the lapping surfaces defining the joint before the solder enters, no solder is blown about by the exploding crystals of the flux. Such explosions occur apparently chiefly from the conversion of the water of crystallization into steam. They are quite violent and can splatter solder over a substantial area. However as just remarked the solder is retained in the trough above the joint until after the melting of the flux—by selection of their relative melting temperatures.

The solder on melting flows toward the line of contact or closest approach of the two lapping wall surfaces and across or beyond such line into the recess of capillary dimensions located inwardly of the trailing edge of the blade, as shown in each of FIGS. 4 to 7, 9 and 10. The flow takes place most rapidly in the areas which are in contact or most nearly so, thus resulting in a rapid flow spanwise throughout the entire length of the blade, such flow further continuing into the enlarging recess up to the limits of capillary action. While voids may occur on the outer walls of the trough beyond the line of contact, the absence of voids inwardly thereof and in the area of said recess is effectively assured. The solder completely covers the areas to be joined and provides a smooth even edge to the forward side of the solder, and with the proper fillet at this edge. FIG. 4 shows the joint and fillet.

As shown in FIG. 3 the blade is supported loosely in a rack 25 substantially free of confining fixtures during soldering.

With solder powder and particularly with nickel-chromium solder powder it is desirable to wipe the surfaces of the trough free of flux although a fine film on the trough surfaces will not be significantly undesirable. If these surfaces are substantially free of flux no significant amount of solder will adhere to them and the joint width of the solder from trailing edge forward will be substantially constant for blades produced successively.

Other walls may be joined by a similar process with variations in the manner of placing the flux and solder. In FIG. 5 the walls 30 and 32 are brought together to form a joint. Flux 34 in the form of a paste or liquid is bonded to the wall 30 as a discrete entity and above it solder 36 is bonded to the wall as a discrete entity. The solder may be applied in paste or liquid form or as a wire. Both the solder and the flux extend substantially the length of the blade span.

The parts are heated in a reducing atmosphere as described above. The flux first melts and runs into the joint, coating and cleaning the surfaces to be bonded. The solder next melts and displaces the flux out of the joint effecting a strong fusion of the parts together. The parts 30 and 32 may also be coated with a film 38 of flux to facilitate the flow of the band of flux 34 into the joint.

Also as shown in FIG. 6 the band of solder 36 may be on a different wall from the band of flux 34.

FIG. 7 shows the solder 40 bonding the parts 32 and 30 together after it has melted and flowed downward.

As shown in FIG. 8 the solder should extend without voids over the area defined by the spanwise length 42 and the chordwise width 22. Voids such as 44 are to be avoided. As remarked above such voids will occur when one wall makes chordwise spaced contacts with the other wall. Solder when it melts will flow rapidly along lines of contact such as 51, 52, 53 in FIGS. 8 and 9. Where there are two lines of contact such as 52 and 53, the solder flowing along these lines will trap flux or gas in the concavity 46 preventing it from being pushed ahead of the solder flowing downward from the trough. There will then be a void 44 in the region of 46.

It has been taught heretofore that parts to be soldered should have their surfaces in contact throughout the areas to be bonded. With certain solders used to bond small areas of steels free of oxides irreducible by hydrogen this may be true. However particularly where irreducible metals are present and flux is employed voids will be present in the solder joining thin walls which contact over a substantial area. For instance with walls of steel less than 0.025 inch thick contacting over a length of several inches and a width of the order of 0.25 inch or more, voids will occur in all or a large percentage of the joints.

This is caused mainly because thin sheet metal surfaces are not sufficiently flat and are not in contact completely throughout the areas to be joined by the solder. Molten solder will flow most rapidly along lines of contact, due to capillary action. This action can be more rapid than the flow transverse to these lines with the result that the solder at lines of contact traps flux or gas in pockets making voids in the solder.

It is also not necessary that the surface be in actual contact along lines spaced apart. It is only necessary that the surfaces be so close together at the spaced lines that the rate of flow of solder by capillary action is large compared to the rate of flow transverse to these lines. This will be true if between the lines the gap between opposite surfaces is relatively large.

Using solders comprised chiefly of nickel or chromium or both, voids in the joints are particularly difficult to avoid since these solders alloy with the steel. This raises the melting point of the new solder alloy. So the solder thickens and loses its ability to spread.

Broadly then to assure void-free bonds of solder in the joint, the walls should be brought into contact along a single line or into soldering proximity at this line. The walls are sufficiently close together if the solder will wet the opposing walls simultaneously. The walls should diverge slightly forward, toward the leading edge, to exclude another line spaced from the first where the walls would be again within soldering proximity of each other. Voids in the solder will then be excluded. If there is only one line of contact between the opposing surfaces voids cannot form.

It is therefore important and this invention teaches that the walls have a single line of contact 60 as shown in FIGS. 1, 5 and 10. From the line of contact 60 the walls diverge very gradually so that in the length 22, FIG. 8, they are just far enough apart to sustain the fillet at the forward edge of the solder and provide the proper width of soldered joint. This will vary some with the fluidity of the solder but the depth of the solder should be less than about 0.015 inch or the divergence of the parts should be less than about 0.050 inch in one inch.

Spaced lines of contact are apt to be present when one or both lapping surfaces have been scarfed making them thinner at the lapping portions than at the other portions of the walls of the blade. Thus in FIG. 9 the wall at 61 has been scarfed or thinned locally resulting in two spaced lines of contact when the surfaces are placed in contact over a substantial chordwise extent.

In FIG. 10a the scarfed surfaces are arranged so that there is only one line of contact. This is accomplished by providing for a definite divergence of the scarfed surfaces forward from the line of contact. The walls as shown in the drawings are not to scale for ease of representation.

In certain instances where very strong soldered joints are desired and particularly where there is more than one part and some of them are of steel containing an alloying metal whose oxides are not reduced by hydrogen, the soldering should be done with some variation in the technique.

The parts of the blade are aggregated into an assembly and secured together by any of a number of means, for instance as by spot welding, mechanical elements such as bolts and the like, or by fixtures.

Solder is secured to the parts in or adjacent to the joints. This may be done with cements, an acrylic cement being satisfactory. For some joints the solder may be added after fluxing.

This assembly is then coated with a flux which is able to dissolve the irreducible oxides on the surface of the metals when heated to soldering temperatures.

Preferably the whole assembly is dipped in a liquid solution or mixture of flux to provide the coating. The mixture is prepared in a suitable vessel 67, FIG. 11, by mixing more of the flux in water than will dissolve at temperatures between 120° F. and 150° F. The flux is kept in suspension by an agitator 69. A good proportion of flux to water is 1 to 2 parts by weight.

Preferably the excess flux mixture is allowed to drain from the blade. A coating will remain which is allowed to dry preferably at ordinary room temperatures to a tacky condition.

Referring now to the blade 70 in FIGS. 12–14 the blade envelope is 72 soldered into the base 74. An internal beam 76 is bonded to the upper and lower walls of the blade.

The parts of the blade before the blade is finished comprise the envelope blank 72, the base 74, and the beam 76. The beam is secured to the blade wall by the spotweld 80. The base may be simply pressed on the root or large end of the blade. Solder, as wire, is cemented to the corners between the beam and the envelope walls as shown at 91—94. Solder is also placed in the recess 96 extending about the blade envelope.

With the solder cemented in place, the assembly is coated with flux, preferably by dipping in a vessel of flux as described above. After being fluxed the assembly is allowed to drain preferably with the trailing edge at the bottom so that the flux tends to flow into the trailing edge joint.

The assembly is next placed in the rack 100 with the trough 102 at the top and the blade chords generally upright. A wire of solder 106 is placed in the trough and the blade is then placed in the retort 110, FIG. 17. Hydrogen is conducted into the interior of the retort by pipe 112 and out by pipe 114 from the drier 116. The retort is placed in a furnace 120 and heated substantially uniformly to a temperature greater than 1650° F. preferably to a value above 1800° F. where hydrogen is active as a reducing agent in removing the oxides of iron, nickel and chromium. The joints are thus soldered under conditions which exclude the oxidation of the parts and the solder.

The hydrogen may be tapped off by tube 128 and its dryness measured in terms of dew point. Entering the retort the hydrogen should have a dew point temperature of −80° F. or lower.

The hydrogen will eliminate the oxides of the main alloying constituents of the stainless steel and the flux will dissolve off the oxides of the irreducible elements. The solder when melted will then wet and spread by capillary action throughout the joints completing the bonding of the parts together. The soldering of the trailing edge joint may be facilitated by adding flux within the trough as a paste or powder.

After soldering the trough is cut off and the blade buffed and finished as shown in FIGS. 12–14.

Where the blade is dipped in flux or is otherwise coated all over and solders such as copper and silver are employed, they will spread completely over the whole surfaces of the parts of the blade inside and out. This has the great advantage that any cracks or tiny holes will be filled with solder assuring the integrity of the parts strengthwise. This is of great importance in blades for a compressor and turbine of a gas turbine power plant such for instance as a jet engine. Invisible cracks, that is microscopic or submicroscopic, can cause fatigue failure in such blades because they are highly stressed and are subject to vibration.

Furthermore with large areas of the envelope fluxed, solder placed anywhere on the envelope will be within soldering reach of any joint giving great assurance that all joints will always be soldered.

The wires of solder inside the blade insure a coating over the blade interior. The joint at the trailing edge is made by the solder in the trough. With the flux on the exterior of the blade, the solder will also spread upward over the edges of the trough and downward on the exterior surfaces completely coating the envelope. Such spreading can also be augmented by adding externally small quantities of solder such as the clip 140 over the edge of the trough in FIG. 16. It will now be clear that there is a great advantage in coating the exterior surface of a blade envelope even though no parts are to be soldered to the external surface of the envelope.

The fluxing of the external surface of the envelope may be applied in selected areas but it is preferred to coat the entire surface. This may be done by any method such as painting, spraying, dipping and the like.

To obtain the spreading of the solder particularly over relatively great areas and to distances relatively far from the original position of the solder, the surfaces should be subjected to the cleaning action of both the flux in proper quantity and the hydrogen of proper dryness where the steel incorporates irreducible metal alloys. If the latter are absent the hydrogen would be effective by itself at temperatures well above 1650° F. preferably higher than 1800° F.

In bonding the parts of the blades of FIGS. 12–14 the joints should be treated according to the disclosures with respect to FIGS. 1–10.

While specific forms of this invention have been illustrated it is to be understood that the invention is not limited to these exact forms but is covered as broadly as indicated by the appended claims.

What is claimed is:

1. The process of joining the walls of a blade together by solder adjacent the trailing edge of the blade comprising the steps of bringing the walls into lapping relation to form a joint at the trailing edge having a line of minimum spacing, said walls converging toward said joint and at least one of said walls extending beyond said trailing edge, placing flux at the joint as a substantially discrete entity, the flux being of a lower melting temperature than the solder to be used, positioning the blade with said one wall extending above the joint adjacent thereto, placing solder as a substantially discrete entity above the joint adjacent thereto and contiguous to the other of said walls so that when the solder is melted it will flow downward into the joint between said walls from above to below said line, placing the blade in a muffle with a reducing atmosphere, heating the blade effecting the melting of said flux at a selected temperature followed substantially later by the melting of said solder at a higher temperature, the solder displacing the flux downward ahead thereof as a substantially separate layer and bonding the walls together by the solder at said joint and over a portion of the blade walls inwardly of the trailing edge of said blade and beyond said line of minimum spacing.

2. The process of making a joint between the two walls of a hollow blade comprising the steps of lapping the walls at an acute angle to form a joint and a capillary recess between said walls inwardly of said joint to be filled with solder, said walls extending beyond said joint in diverging relation one to the other defining a trough, positioning the joint with said extending walls above the recess, coating the internal surfaces of the walls of the recess with flux of a selected lower melting temperature, placing solder in the trough, the solder including an oxidizable metal having a substantially higher melting temperature than the flux, placing the blade in a muffle having a reducing atmosphere, and heating the blade to first melt the flux followed by melting of the solder which runs downward effecting the bonding of the walls together at said joint and providing a substantial solder fillet of relatively smooth and uniform boundary in said recesses extending on both sides thereof.

3. The process of joining the walls of a blade together by solder comprising the steps of bringing the walls together in converging relation toward a capillary recess to form a joint with at least one wall portion turned outward relative to the other wall defining a trough extending spanwise beyond said joint, coating the blade interior adjacent said joint with flux of selected lower melting temperature leaving the trough interior surfaces relatively free of flux, positioning the blade with the trough above the joint, placing solder in the trough of a higher melting temperature than said flux, heating the blade in a reducing atmosphere to the melting temperature of the solder effecting the bonding of the walls by solder at said joint with said solder extending throughout and inwardly of said recess, and thereafter removing said trough and shaping said blade adjacent said soldered portion to form the trailing edge of the blade.

4. The process of making a soldered joint between the walls of a blade along a spanwise edge thereof comprising the steps of bringing the walls into substantial contact along a single line with the opposed walls at the joint continuously diverging in both directions away from said line of contact to exclude another line of contact spaced chordwise from the first line, applying solder to the blade immediately adjacent but exterior to and confined to one side of said line of contact, and heating the blade and solder under conditions to exclude oxidation of the parts and solder completing the formation of said joint by the flow of solder to said line of contact and inwardly thereof over the adjacent portion of said diverging walls.

5. The process of making a soldered joint between the walls of a blade for compressors, turbines and the like along a spanwise edge of the blade comprising the steps of thinning locally the portions of the walls for the joint, bringing the walls into substantial contact along a spanwise line of minimum spacing with the opposed walls diverging slightly inwardly of said line in the general chordwise direction to exclude another line along which the walls would be within soldering proximity thereby providing for a band of solder in the joint substantially free of voids, placing solder on the blade outwardly of and confined to one side of said line of contact within soldering reach of the joint, and heating the blade under conditions to exclude oxidation of the walls and solder with resulting flow of said solder inwardly of said line completing the joining of the walls of the blade by solder.

6. The process of joining the walls of a blade together by solder to provide a joint substantially free of voids comprising bringing the walls together along substantially a single line of minimum contact with the walls diverging from each other inwardly of said line defining a recess of capillary size adjacent said line, providing an extension on at least one of said walls outwardly of said line of contact with said extension being bent relative to its adjacent wall portion to stiffen said wall, locating solder adjacent and outwardly of said line of contact and accessible for flow therefrom into said recess, and applying heat to cause the flow of said solder under capillary action across said line and into and inwardly of said recess with resulting formation of said joint free of voids.

7. The process as defined in claim 6 in which the solder is placed on one side only of the line of contact.

8. The process of uniting adjoining surfaces of separate walls to join the walls into an integral hollow blade structure by soldering, comprising bringing the walls into substantial contact along a line of minimum spacing adjacent the trailing edge and extending over the entire span of the blade, forming the adjoining surfaces of said walls so as to have a capillary space increasing in thickness inwardly away from said line to form a recess and of substantially uniform thickness in the direction of said line to provide greater capillarity in the spanwise direction than in the direction of increasing thickness, placing soldering material on one of said walls along the span of said blade but on and confined to the other side of said line from said recess for flow into said capillary space, heating said soldering material to render it molten, and causing the molten soldering material to flow initially by capillary attraction throughout the entire spanwise extent of said space followed by flow toward said space and into and beyond said recess to bond said walls into an integral structure substantially free of voids.

References Cited in the file of this patent

UNITED STATES PATENTS

| | | |
|---|---|---|
| 1,530,249 | Eveleth | Mar. 17, 1925 |
| 1,849,089 | Huthsing | Mar. 15, 1932 |
| 2,126,074 | Wissler | Aug. 9, 1938 |
| 2,157,918 | Rankin | May 8, 1939 |
| 2,503,431 | Bender et al. | Apr. 11, 1950 |
| 2,515,179 | Barger | July 18, 1950 |
| 2,559,131 | Oestrich et al. | July 3, 1951 |
| 2,577,336 | Lampton | Dec. 4, 1951 |
| 2,598,027 | Weir et al. | May 27, 1952 |
| 2,674,790 | Edson et al. | Apr. 13, 1954 |

FOREIGN PATENTS

| | | |
|---|---|---|
| 625,693 | Great Britain | July 1, 1949 |
| 651,117 | Great Britain | Mar. 14, 1951 |